(12) United States Patent
Singh et al.

(10) Patent No.: US 12,314,235 B2
(45) Date of Patent: May 27, 2025

(54) CROSS ORGANIZATIONAL METADATA MIGRATION

(71) Applicant: Honeywell International Inc., Charlotte, NC (US)

(72) Inventors: Ankit Singh, Apex, NC (US); Eric Hartye, Oak Ridge, TN (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 0 days.

(21) Appl. No.: 18/060,150

(22) Filed: Nov. 30, 2022

(65) Prior Publication Data

US 2024/0176767 A1 May 30, 2024

(51) Int. Cl.
G06F 16/20 (2019.01)
G06F 16/21 (2019.01)
G06F 16/28 (2019.01)

(52) U.S. Cl.
CPC .......... *G06F 16/214* (2019.01); *G06F 16/285* (2019.01)

(58) Field of Classification Search
CPC .............................. G06F 16/214; G06F 16/285
See application file for complete search history.

(56) References Cited

U.S. PATENT DOCUMENTS

| | | | | |
|---|---|---|---|---|
| 10,546,311 B1* | 1/2020 | Gupta | ................. | G06Q 30/0204 |
| 11,763,258 B2* | 9/2023 | Fong | ..................... | G06Q 10/10 715/751 |
| 2002/0194039 A1* | 12/2002 | Bhaskaran | ......... | G06Q 10/0639 705/7.31 |
| 2003/0014483 A1* | 1/2003 | Stevenson | ................. | H04L 9/40 709/246 |
| 2003/0110067 A1* | 6/2003 | Miller | .................... | G06Q 10/06 705/7.23 |
| 2015/0169782 A1* | 6/2015 | Sistu | ..................... | G06F 16/972 707/708 |
| 2016/0189105 A1* | 6/2016 | Stuhec | ................ | H04L 12/1827 705/342 |
| 2017/0060918 A1* | 3/2017 | Iyer | ....................... | G06F 3/0685 |
| 2019/0327271 A1* | 10/2019 | Saxena | ...................... | G06F 8/38 |
| 2020/0244605 A1* | 7/2020 | Nagaraja | ................ | H04L 51/02 |
| 2021/0097069 A1* | 4/2021 | Schwartz | ............... | G06Q 10/08 |
| 2021/0099461 A1* | 4/2021 | Schwartz | .............. | G06F 16/252 |
| 2022/0035823 A1* | 2/2022 | Morton | ................. | G06F 16/243 |
| 2022/0309411 A1* | 9/2022 | Ramaswamy | ....... | G06Q 10/067 |

* cited by examiner

Primary Examiner — Tarek Chbouki
(74) Attorney, Agent, or Firm — ALSTON & BIRD LLP

(57) ABSTRACT

Various embodiments described herein relate to managing metadata between organizations within an enterprise. In this regard, a set of code comprising one or more code features is received from a first organization. The one or more code features are tagged with one or more code feature tags to associate each of the one or more code features with the one or more code feature tags. The one or more tagged code features are stored in a repository based on the one or more code feature tags. The repository is at least partially accessible by a second organization. Based on a request received from a requestor for one or more features, it is determined if the one or more requested features are tagged code features. Further, one or more of the tagged code features are provided to the requester based on the requested features having been tagged as tagged code features.

17 Claims, 8 Drawing Sheets

CROSS ORGANIZATIONAL METADATA MIGRATION

TECHNICAL FIELD

The present disclosure relates generally to migrating metadata, and more specifically, to migrating metadata in between organizations within an enterprise.

BACKGROUND

Subsets of an organization (e.g., business groups such as sales, operations, etc.) may find it convenient to transfer data and data configurations between themselves. However, there are certain scenarios where the entire configuration is not necessary to be migrated between source and target organizations. The content of metadata to be transferred depends on various factors like common business use cases across the two organizations, for example both organizations may need auditing information and both organizations may need to transfer products related metadata, but one organization may choose to keep customer specific metadata to its boundaries. However, based on various business reasons, the metadata might have been selectively transferred. Similar to this, IT governance may drive the need to selectively transfer metadata. For example, in case of new M&A, the IT support for a new organization may be smaller than for a parent organization, and therefore it might make sense to selectively bring metadata in phases based on the capability to support the new migrated metadata.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In one embodiment, a computer implemented method includes: receiving a set of code from a first organization, wherein the set of code comprises one or more code features; tagging the one or more code features with one or more code feature tags to associate each of the one or more code features with the one or more code feature tags; storing the one or more tagged code features in a repository based on the one or more code feature tags, wherein the repository is at least partially accessible by a second organization; receiving a request for one or more features from a requester; determining if the one or more requested features are tagged code features; and providing one or more of the one or more tagged code features to the requester based on the requested features having been tagged as tagged code features.

In another embodiment, a system includes one or more computing devices; a memory storing one or more computer readable instructions stored in the memory and accessible by the one or more computing devices, that when executed by the one or more computing devices cause the system to: receive a set of code from a first organization, wherein the set of code comprises one or more code features; tag the one or more code features with one or more code feature tags to associate each of the one or more code features with the one or more code feature tags; store the one or more tagged code features in a repository based on the one or more code feature tags, wherein the repository is at least partially accessible by a second organization; receive a request for one or more features from a requester; determine if the one or more requested features are tagged code features; and provide one or more of the one or more tagged code features to the requester based on the requested features having been tagged as tagged code features.

In yet another embodiment, a computer implemented method includes: receiving a request to generate a temporary organization in which to test one or more features of a test product; generating the temporary organization in response to the received request to generate the temporary organization; providing access to the temporary organization to a user of the temporary organization; receiving one or more developed features that have been tagged with one or more feature metadata tags, which feature metadata tags related the feature to an aspect of a business domain; storing the one or more received features that have been tagged with one or more feature metadata tags in an expected metadata database; receiving a request for one or more of the received features based on the metadata tags associated with the received feature; and providing the one or more requested features to a second user based on the received request.

To the accomplishment of the foregoing and related ends, certain illustrative aspects are described herein in connection with the following description and the appended drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

Embodiments of the disclosure will now be described, by way of example only, with reference to the accompanying drawings in which.

DETAILED DESCRIPTION

Often, data must be migrated from one organization to another within a larger organization. In some of these situations, it may not be necessary to migrate an entire configuration of data from a source organization to a target organization. In such situations, the content of the to-be-transferred metadata may depend on various factors like commonality of business practices between the two organizations and other factors. Methods of transferring metadata can include receiving a set of code including one or more features from a first organization and tagging the features with tags to associate the features with the tags, which tags can then be stored and recalled by a target organization at a later time to more conveniently transfer the relevant data. Embodiments described herein include further steps and details for accomplishing the transfer of data between organizations.

Figure 1:
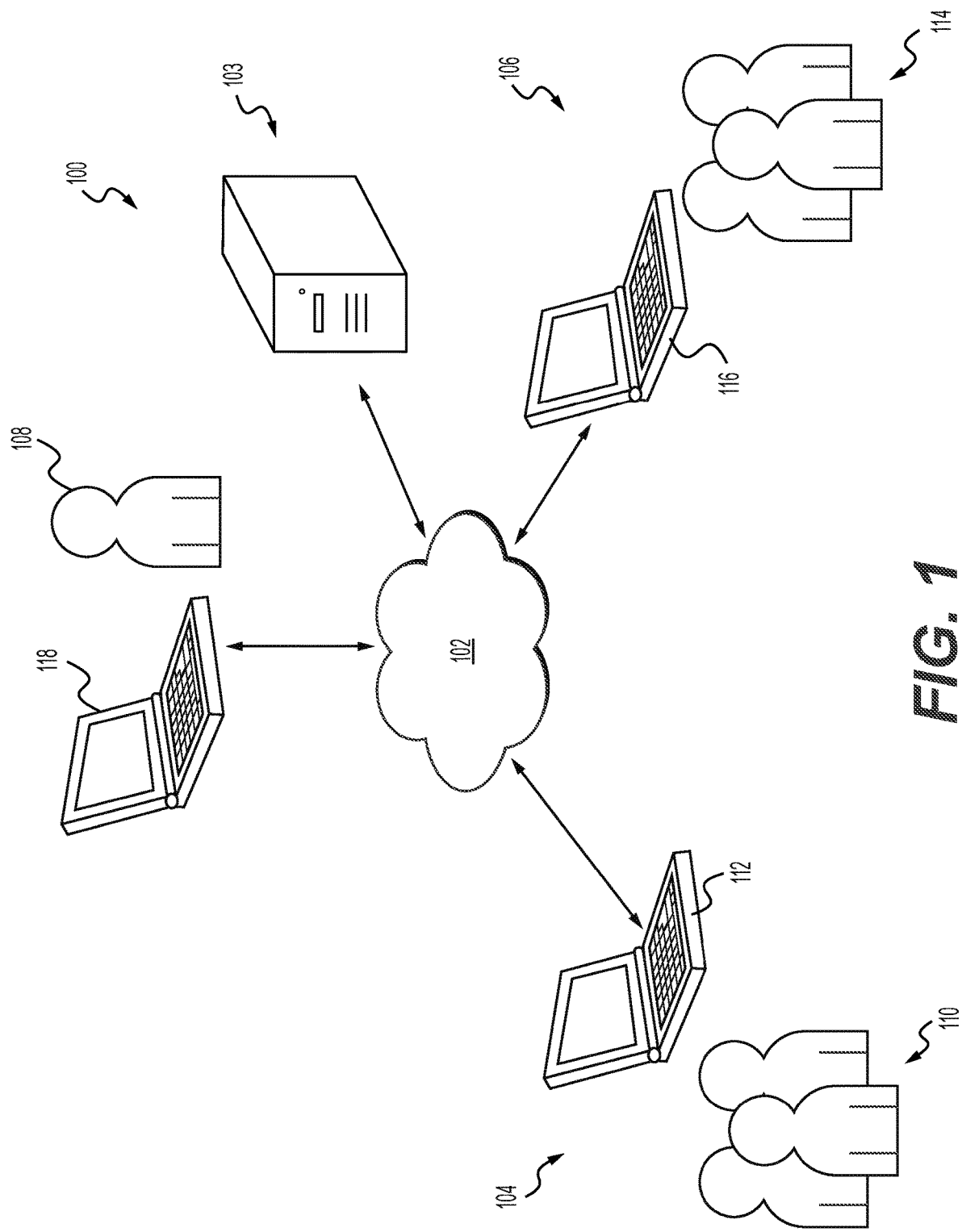
FIG. 1 illustrates an exemplary computer environment for cross organizational metadata migration, according to one or more embodiments shown and described herein.

Referring to FIG. 1, a system 100 includes a network 102 for communicatively coupling one or more organizations. For example, a first organization 104 may be communicatively coupled to a second organization 106 through the network 102, which network 102 may be communicatively coupled with a cross-organizational server 103. The first organization 104 may be, for example, a source organization, which may be a source for a selection of metadata, and the second organization 106 may be, for example, a target organization, which may be a target for a selection of metadata. In some embodiments, an administrator 108 may also be communicatively coupled to the network 102 to administer the same.

The first organization 104 may include multiple first organization users 110, which first organization users 110 may access the network 102 through various devices, such as the device 112. The second organization 106 may include multiple second organization users 114, which second organization users 114 may access the network 102 through various devices, such as the device 116. The administrator 108 may include one or more administrative accounts representative of various administrators, which may access the network 102 through an administrative terminal 118.

The network 102 may be one or more network(s) that may be configured as a network or collection of networks (e.g., a proprietary intranet, the Internet, a virtual private network (VPN), a local area network (LAN), a wireless local area network (WLAN), combinations thereof, etc.) through which network 102 the first organization 104 and the second organization 106 may access the cross-organizational server 103 and/or communicate (e.g., with one another, with the cross-organizational server 103, etc.)

The cross-organizational server 103 may include one or more servers or other computing devices, any or all of which may include one or more processors and memory. The memory may store one or more computer executable instructions to implement the systems and methods described herein. The cross-organizational server 103 may enable the first organization 104 and the second organization 106 to communicate with one another through, for example, one or more cross-organizational meta data sharing applications as described in greater detail herein.

In some embodiments, the cross-organizational server 103 may receive and/or store user data associated with one or more individual users in the first organization 104, one or more individual users in the second organization 106, and one or more administrators 108. The user data may include, for example, a classification of any particular user or group of users (e.g., administrator, basic user, etc.), a content access level associated with an account (e.g., read/write, read only, etc.), organizational tags, individual user or group preferences, etc.

Figure 2:
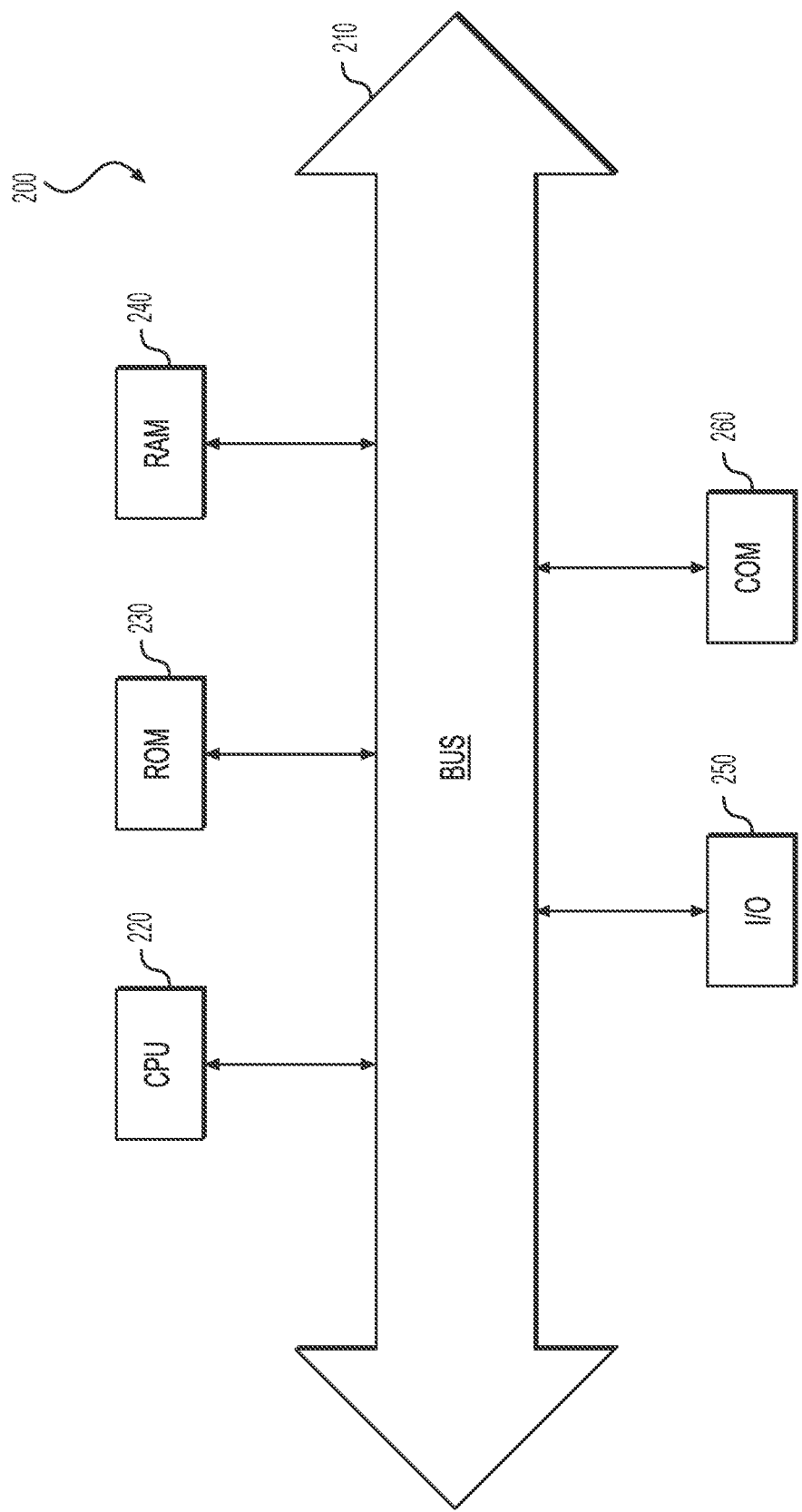
FIG. 2 illustrates a system environment for migrating metadata across organizations.

FIG. 2 shows a simplified functional block diagram of a computing system 200 that may be configured for carrying out one or more of the steps, programs, and/or executing techniques described herein, according to exemplary embodiments of the present disclosure. Specifically, in one embodiment, any of the modules of the computing devices 112, 116, 118, and 103 of FIG. 1 or the computing devices 112, 116, 118, and 103 themselves may be an assembly of software and/or hardware including, for example, a data communication interface 260 for packet data communication. The platform may also include a central processing unit ("CPU") 220, in the form of one or more processors, for executing program instructions. The platform may include an internal communication bus 210, program storage, and data storage for various data files to be processed and/or communicated by the platform such as ROM 230 and RAM 240, although the system 200 may receive programming and data via network communications. The system 200 also may include input and output ports 250 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

FIG. 2 and the following discussion provide a brief, general description of a suitable computing environment in which certain embodiments and aspects thereof the present disclosure may be implemented. In one embodiment, any of the disclosed systems, methods, and/or graphical user interfaces may be executed by or implemented by a computing system consistent with or similar to that depicted in FIG. 2. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Figure 3:
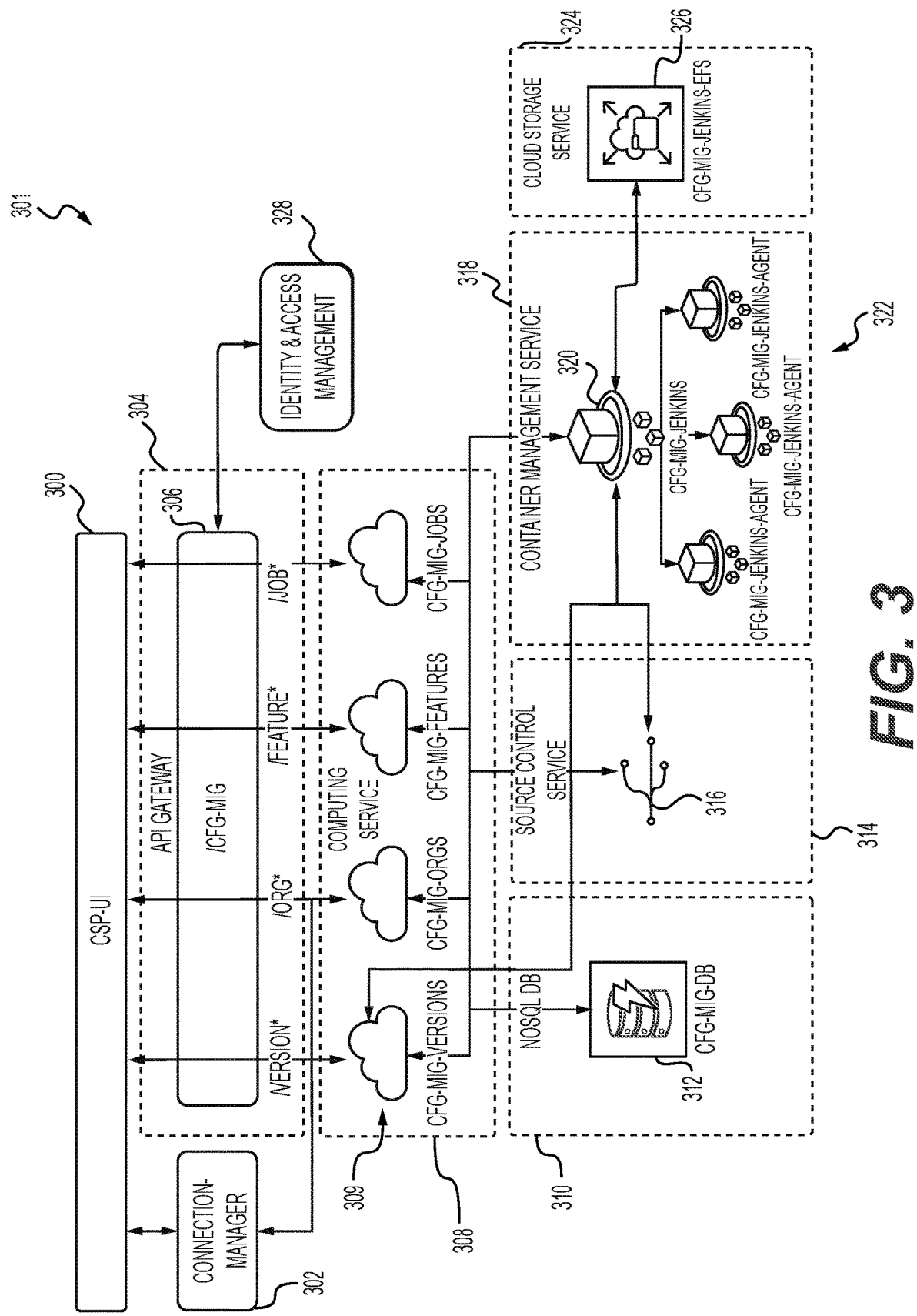
FIG. 3 illustrates an exemplary system diagram for migrating data across organizations.
Figure 4:
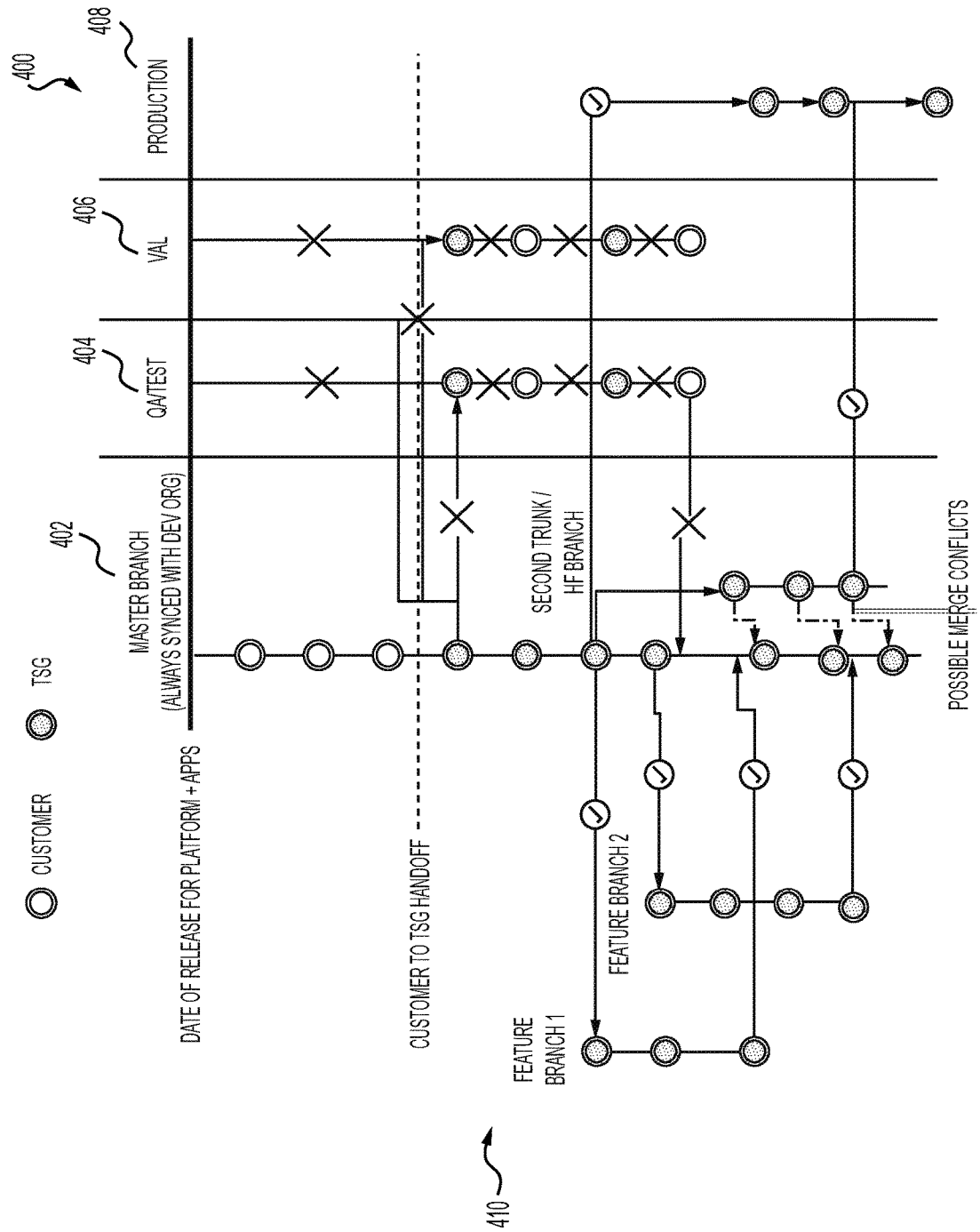
FIG. 4 illustrates a timeline for migrating data across organizations.

Referring to FIG. 3, an exemplary system diagram 301 for migrating data across organizations is shown. The system diagram 301 includes various applications and interfaces including a communications service provider user interface ("CSP-UI") 300, a connection manager 302, an API Gateway 304, a computing service 308, an NOSQL database 310, a source control service 316, a container management service 318, a cloud storage service 324, and an identity and access management module 328. The various applications and interfaces may include their own submodules and applications as described herein.

The CSP-UI 300 maybe a user interface for connecting to and operating on a communication service provider (CSP). CSPs may include companies deploying networks through which end users (e.g., the members of the first and/or second organizations) obtain network connectivity. CSPs can include, for example, mobile or cellular network providers (e.g., operating 5G networks or other networks), wired internet service providers (e.g., cable, optical fiber, etc.), and WiFi providers (e.g., at locations such as airports, coffee shops, etc.)

The connection manager 302 may perform any of a plurality of actions with regard to the network 102 and the users of the network connected thereto through devices 112, 116, and 118 based on device data or network data that is associated with the network 102. For example, the connection manager 116 may adjust a network polling frequency for a network, may prompt a user to automatically select a network, may automatically connect to a network, or may automatically disconnect from a network. In some embodiments, the connection manager 302 may manage connections to the cross-organizational network server 103.

The API gateway 304 may be, for example, a system, process, and/or computer program product that administers network policy and configuration management within and before the network 102. The API gateway 304 may, for example, receive a native application programming interface (API) request at the API gateway 304, process the native API request based on contents of the native API request using the API gateway 304, and send the native API request (e.g., an unmodified native API request) to the network 102 or other network or component of the network 102. The API gateway 304 may include a configuration migration module 306 that may facilitate the migration of configurations between organizations and may include, for example, an automatic migration functionality to coordinate a transfer of storage, memory, and/or compute resources; and a service configuration for linking service configuration data indicating the usage and configuration of respective services and service resources to migrate.

The computing service 308 may be a cloud-based computing service (e.g., in the network 102) that may process one or more lines of code that may run, for example, without provisioning or managing servers and may be a high-availability computing infrastructure which may perform all administration of computing resources thereon including, for example, server and operating system maintenance, capacity provisioning and automatic scaling, and logging.

The NOSQL database 310 may be one or more non-tabular databases that may store data in a format that is other than relational tables. The NOSQL database 310 may take a variety of formats based on the particular data model that is created within the system diagram 301, for example, one or more of a document, key-value, wide-column, graph, etc. format. The NOSQL database 310 may provide flexible schemas and may scale with large amounts of data and high user loads. The configuration manager database 312 may be a subset of the NOSQL database 310.

The source control service 314 may track and manage changes to code within the system diagram 301. The source control service 314 may, for example, provide a running history of code development and help to resolve conflicts when merging contributions from multiple sources. The source control service 314 may include one or more source control managers 316, which may, for example, store code, binaries, and metadata in a redundant fashion with high availability. Using the source control service 314, users may be able to collaborate with local and remote users to edit, compare, sync, and revise code and other data on the system diagram 301.

The container management service 318 may, for example, automate the creation, deployment and scaling of containers 322. Containers may be, for example, packages that may bundle single apps together with their dependencies to make applications easier to develop, deploy and manage across the network 102. The containers may, for example, run on one shared operating system, which may enable them to quickly load and to run across multiple clouds (e.g., the network 102) and platforms and to move to external or different network environments. The container management service 318 may facilitate the addition, replacement, and organization of containers on a network-wide scale.

The cloud storage service 324 may provide scalable, elastic, encrypted file storage for use with cloud-based services and local (e.g., on-premises) network resources. The cloud storage system may be configured to automatically change its size based on the number and size of files and other data stored in the system.

The identity and access management module 328 may communicate by a proprietary or open source software using an applicable protocol to enable users to be authenticated through a sign-on process. The identity and access management module 328 may identify users (e.g., using a user identity, one or more public key identities, or other secure identities) and provide access to the network 102.

Figure 5:
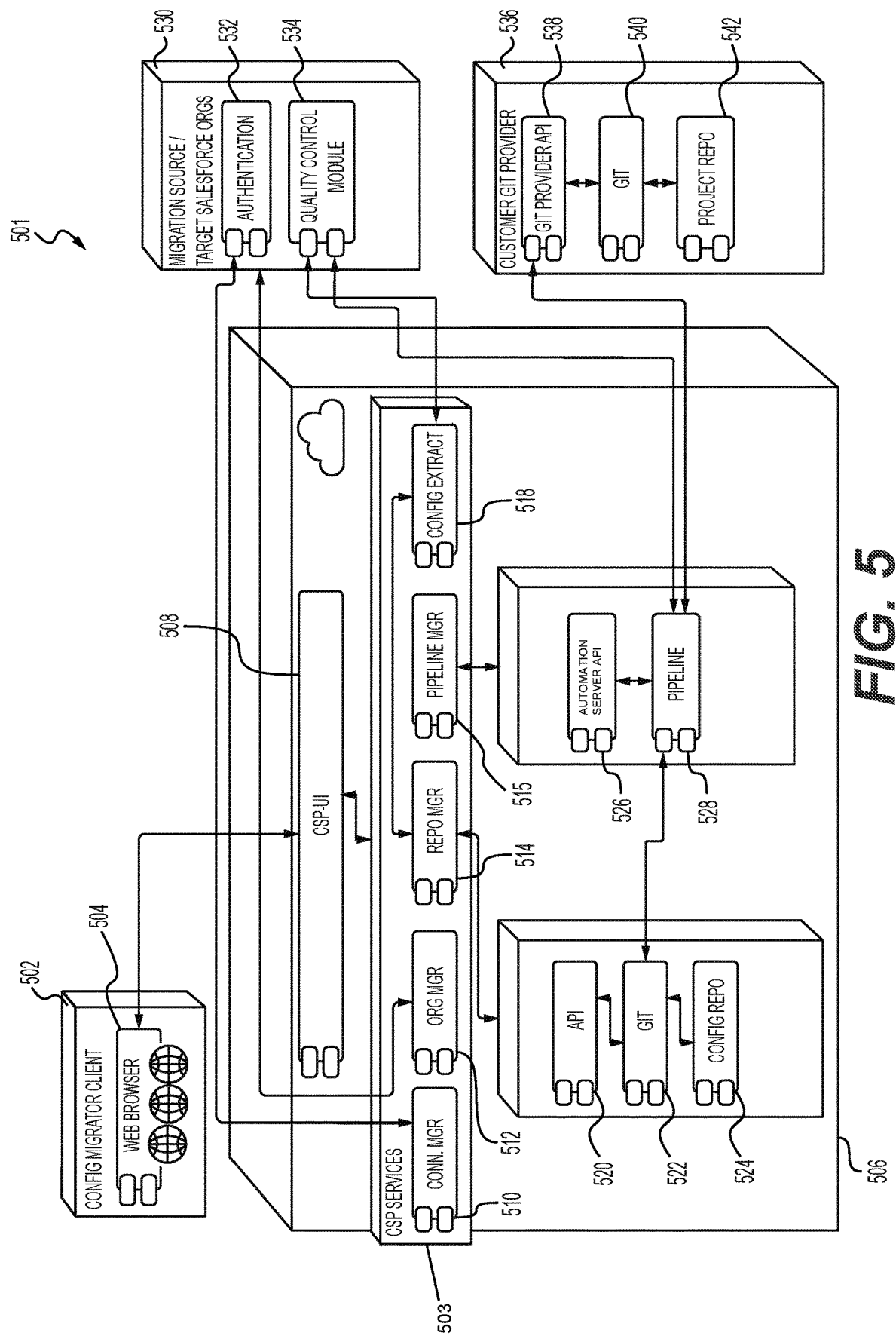
FIG. 5 illustrates a second exemplary system diagram for migrating data across an organization.

Referring to FIG. 5, a system diagram 501 is shown. The system diagram 501 includes a configuration migrator client 502, a CSP services module 503, a network server 506, an external migration source/target module 530, and a customer git provider module 536.

The configuration migrator client 502 may include, for example, a web browser 504. The configuration migrator client 502 may be used to transport configuration and test data from one environment to another. The configuration migrator client 502 may, for example, provide a means to capture configuration and test data, use such configuration and test data in source control, and use the configuration and test data to automate testing.

The CSP services module 503 may include one or more modules or programs that provide one or more cloud services such as, for example, a connection manager 510, an organizations manager 512, a repository manager 514, a pipeline manager 515, and a configuration extractor 518. The connection manager 510 may be similar to the connection manager 302 described herein. The organizations manager 512 may be used to, for example, configure one or more users or organizations of users of the system 501, to record the entities to which the users and organizations of users belong, respectively, which may include, for example, controlling access and authorizations to and quotas of organizations to the system itself and to the various applications thereof. The repository manager 514 may, for example, identify, generate, create, build, manage, define and/or provide access to one or more collections of data and the repository manager may generate one or more repositories of data in order to collect and/or transfer metadata between organizations based on tags associated with the data in the one or more repositories of data. The repository manager 514 may, for example, define one or more repositories of data to query a set of data for a particular tag (e.g., identify a document or other file tagged with a specific hashtag based on a user request). The pipeline manager 515 may, for example, monitor and manage processing resources in comparison with one or more requested tasks or requirements in order to assign the task or requirement to the best available computing resources. The pipeline manager 515 may contact one or more computing resources in order to determine availability for a given requirement or task and provide the given requirement or task to the available computing resource based on the availability.

The GIT module 522 may be a distributed, open-source version control system that may enable code storage, version history tracking, change code merging, and reversion to previous code versions as necessary. The GIT module 522 may store source code and its development history in, for example, the configuration repository module 524. One or more branches may be stored in the configuration repository module 524 and these branches may be worked on separately from a set of main source code. In some embodiments, the API module 520 may function to make the one or more branches and/or the source code itself accessible to or by various external programs.

The open source automation server API 526 may be an API for connecting to and communicating with an open source automation server, for instance, the Jenkins open source automation server. The open source automation server may, for example, automate some facets of software development related to building, testing, and deploying, which may facilitate continuous integration and continuous delivery. The open source automation server API 526 may serve as an intermediary between the open source automation server and the system 501. The pipeline module 528 may couple with the open source automation server API 526 to enable the writing of building instructions using a domain specific language based on one or more programming languages (e.g., Apache Groovy).

The customer git provider module 536 may provide access to one or more customer repositories of the linked customer and may include, for example, a git provider API module 538, a customer git module 540, and one or more project repositories 542.

Figure 6:
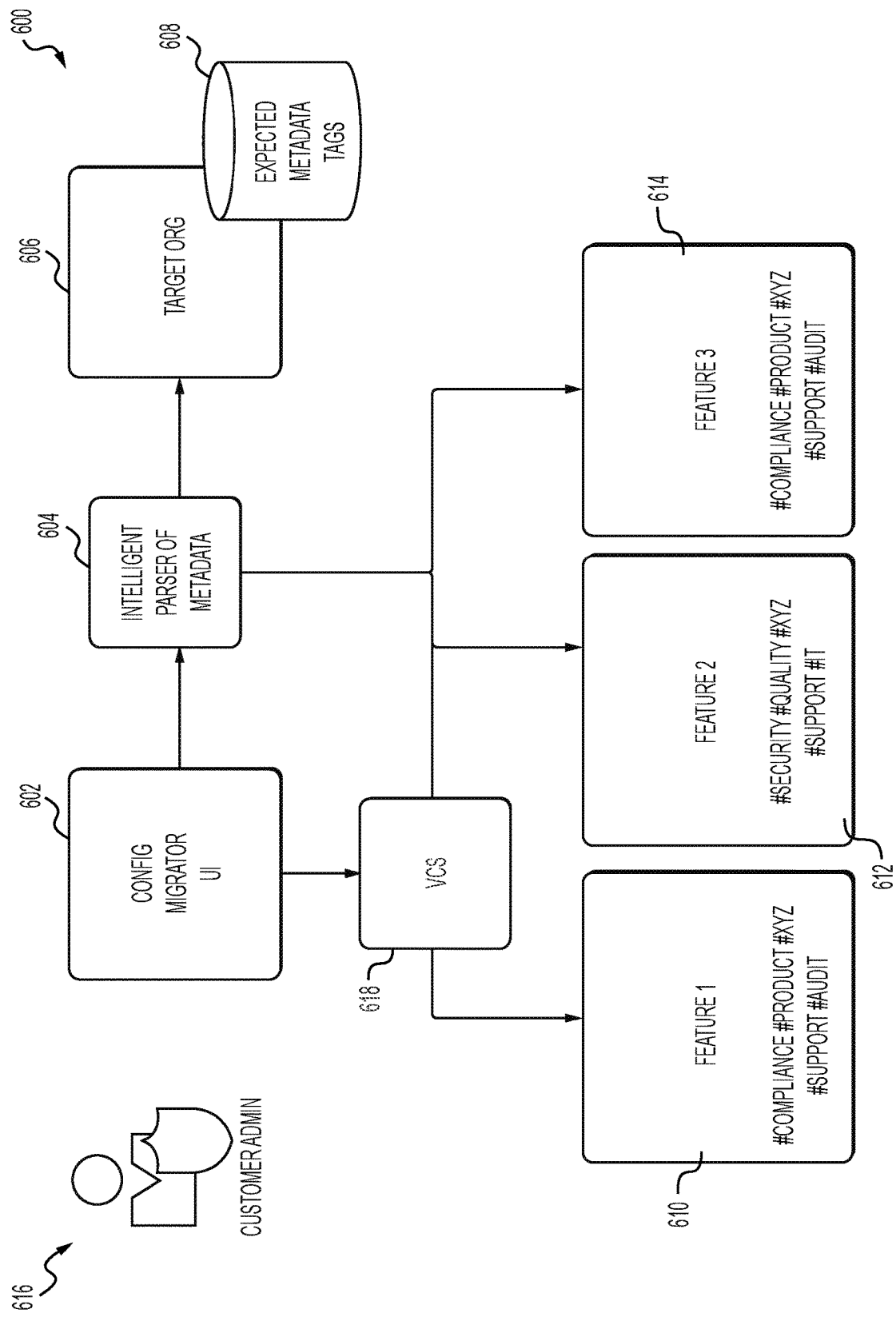
FIG. 6 illustrates a data flow chart for migrating data using one or more data tags.

Referring now to FIG. 6, a flow of information using one or more of the systems described herein is shown. FIG. 6 includes a system flow 600 including a configuration migrator user interface 602, an intelligent parser of metadata module 604, a target organization module 606 which may include an expected metadata tags database 608, and one or more features including a first feature 610 including first feature tags (e.g., #compliance, #product, #xyz, #support, #audit), a second feature 612 including second feature tags (e.g., #security, #quality, #xyz, #support, #it), and a third feature 614 including third feature tags (e.g., #compliance, #product, #xyz, #support, #audit). In embodiments, a customer admin 616 may login and be authenticated to begin the workflow described herein.

An exemplary work flow may include a customer admin 616 logging into a data migration managing tool using, for example, a configuration migrator user interface 602. Using the user interface, the customer admin may initiate the process of data migration using one or more tools in the user interface 602. The customer admin 616 may begin to develop one or more features and these one or more features may be stored in, for example, a customer repository. Each time a customer admin 616 develops a new feature, they may create a temporary scratch organization in one or more of the modules hosted on the network server 103 (e.g., the quality control software module 534), which may give the developer the capability to develop and test thei code before submission to a central code repository. While in development of the code, the customer admin 616 can tag one or more tags to the feature (e.g., using a version control system's tags, using another metadata stores tags, etc.), which tags may associate a feature to a business and/or an IT specific domain so that when the developed features are submitted, the customer admin 616 builds a collection of models in the organization that are classified by the various metadata tags.

When a customer admin later initiates a data migration (e.g., during a merger, during an audit, etc.), the features may be parsed into one or more objects, fields, flows, and other metadata and selectively migrates the data based on the tagged metadata.

Figure 7:
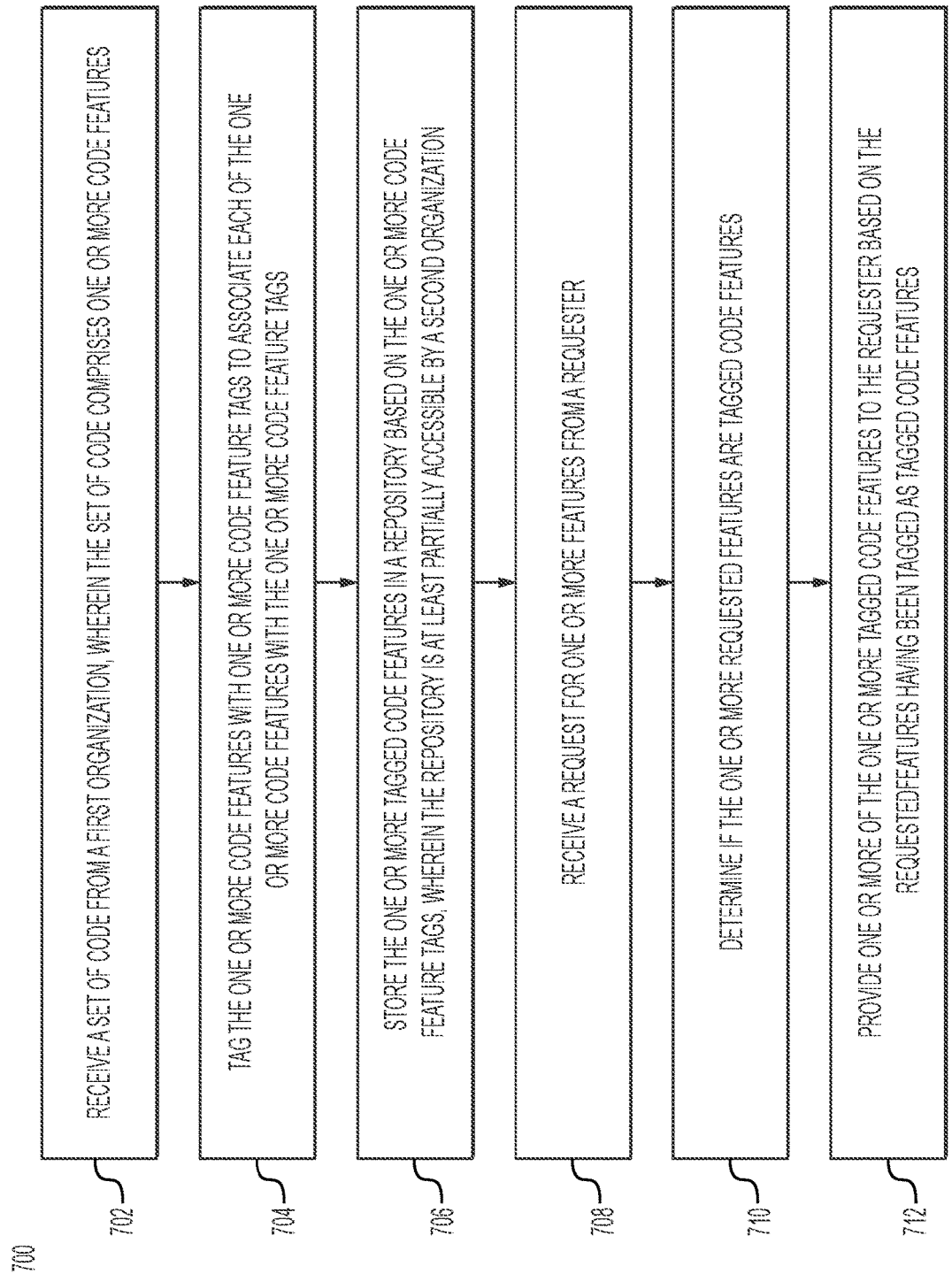
FIG. 7 illustrates a method for migrating data across organizations.

Referring now to FIG. 7, a method 700 of migrating metadata across an organization is described. It is to be understood that the steps of the method 700 is not limiting and that other methods including fewer or additional steps to what is shown are within the scope of this disclosure.

At step 702, a system may receive a set of code from a first organization, wherein the set of code comprises one or more code features. The set of code may be received, for example, at a network server. The first organization may be, for example, an organization that has just merged with (e.g., purchased, etc.) a second organization and the two organizations may require merging of their data including metadata.

At step 704, one or more users (e.g., a first organization administrator) may tag the one or more code features with one or more code feature tags to associate each of the one or more code features with the one or more code feature tags. The code feature tags could relate the code feature to portions of the data that will be transferred from one organization to another. For example, the one or more users could tag the code features with tags such as: #compliance for compliance related code features; #security for security related code features; #audit for audit related code features, etc.

At step 706, the one or more tagged code features may be stored in a repository based on the one or more code feature tags. In some embodiments, the repository may be at least partially accessible by a second organization. The repository may be related or relatable to the one or more code feature tags. For example, all code features tagged with an #audit tag may be stored in an audit or financial history repository. As another example, code features tagged with a #quality, a #qualityassurance tag, or other quality-related tag may be stored in a repository along with other quality-related tags.

At step 708, a request for one or more code features may be received from a requester. The requester may be, for example, a member of a second organization (e.g., an organization that was purchased during a merger, that was the purchasing organization during a merger, etc.). The requester may have sufficient security and access permissions (as determined by, for example, an identity and access module 328) to access all of the data on the databases on which the one or more code features are stored (e.g., the expected metadata tags database 608).

At step 710, the network server or other connected computing device may determine if the one or more requested features are tagged code features. The determination may be necessary such that features which are irrelevant to the inter-organizational transfer of metadata are not transferred to the requester. That is, if data is irrelevant to a particular aspect of the two organizations, it would have been tagged by a user in the first organization with a relevant metadata tag and would have thus been stored in the appropriate databases. However, if such data is not relevant, it would not have been tagged and thus not stored.

At step 712, based on the determination at step 710, the one or more of the one or more tagged code features may be provided to the requester based on the requested features having been tagged as tagged code features.

Figure 8:
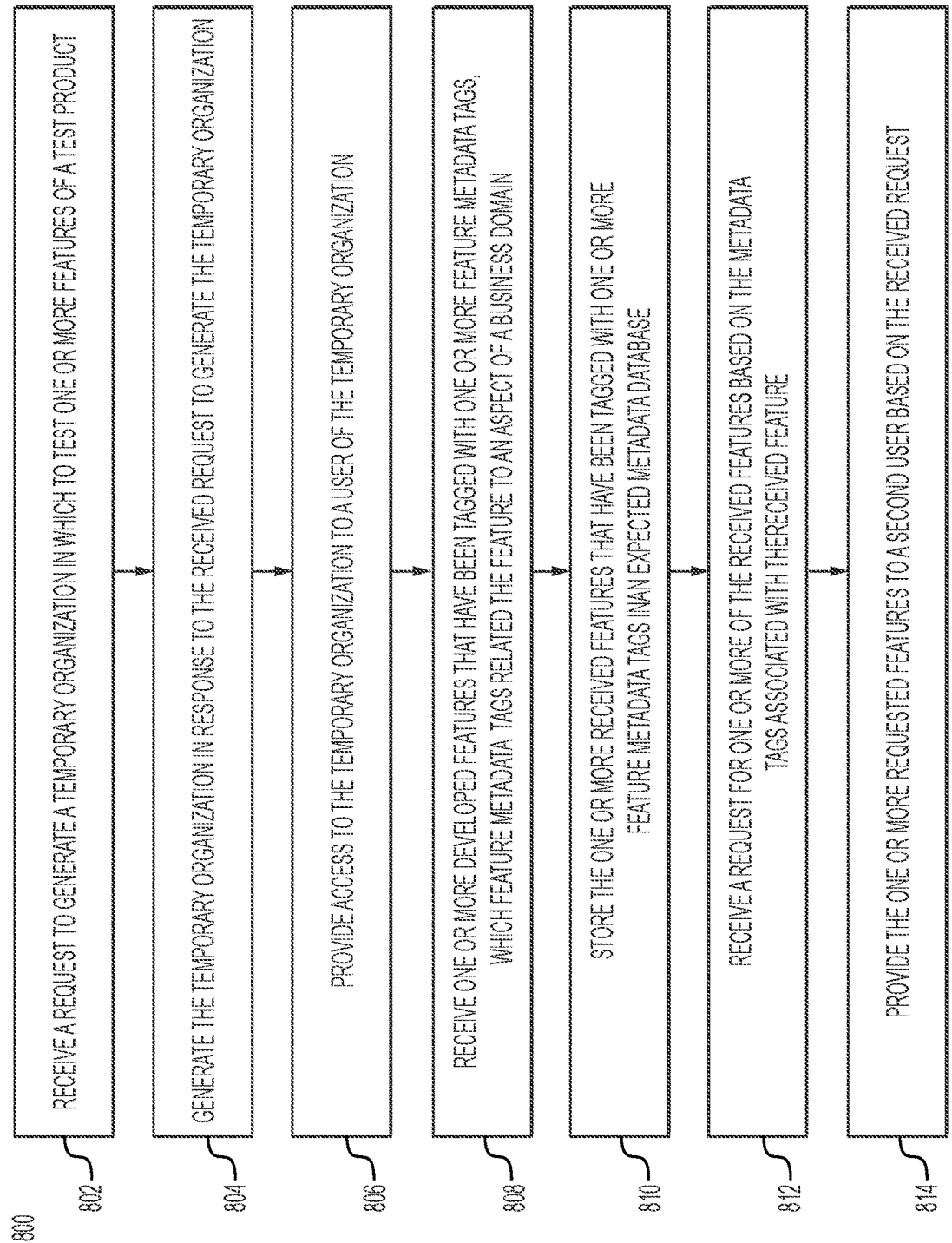
FIG. 8 illustrates another method for migrating data across organizations.

Referring now to FIG. 8, a method of migrating metadata within an organization is shown. It will be appreciated by those skilled in the art that the method steps listed in FIG. 8 are merely exemplary and that one or more additional steps or migrating metadata are within the scope of the application.

At step 802, a request to generate a temporary organization in which to test one or more features of a test product may be received. The request may be received, for example, at a system such as the system described in FIG. 3. The request may come from, for example, a user admin, such as a customer admin, a client admin, etc.

At step 804, a temporary organization may be generated in response to the received request to generate the temporary organization. The temporary organization may be referred to as, for example, a temporary scratch org. The temporary scratch org may afford a developer the capability to develop and test one or more sets of code before submitting the one or more sets of code to a central code repository, which may be accessible by one or more other users of the system.

At step 806, access to the temporary organization may be provided to a user of the temporary organization. For example, an authentication module (such as the authentication module 532) may authenticate a user's profile to verify that user's profile should be allowed access to the temporary organization and the temporary organization may be made accessible to the user based on the authenticated profile.

At step 808, one or more developed features that have been tagged with one or more feature metadata tags may be received. The feature metadata tags may relate the feature(s) to an aspect of a business domain. For example, if a particular developed feature relates to an audit, security, compliance, etc. the feature may be tagged with a metadata tag that relates to same (e.g., #audit, #security, #compliance, etc.)

At step 810, the one or more received features that have been tagged with one or more feature metadata tags may be stored in an expected metadata database and upon a request for one or more of the received features based on the metadata tags associated with the received feature (e.g., from a second user) at step 812, the one or more requested features may be provided to the second user based on the received request at step 814;

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A computer implemented method comprising:
receiving a set of code from a first organization, wherein the set of code comprises one or more code features;
tagging the one or more code features with one or more code feature tags to associate each of the one or more code features with the one or more code feature tags;
storing the one or more tagged code features in a repository based on the one or more code feature tags, wherein the repository is at least partially accessible by a second organization, wherein the second organization corresponds to an organization that is to be merged with the first organization, and wherein the one or more tagged code features comprise the one or more code feature tags tagged based at least on commonality of practices between the first organization and the second organization;
receiving a request for one or more features from a requester, wherein the requester is a member of the second organization;
identifying one or more first tagged code features from the one or more tagged code features based on the request received;
generating at least one data repository using the one or more first tagged code features;
determining if the one or more requested features are tagged code features in the at least one data repository;
verifying if the requester has an access to the requested one or more features in the at least one data repository based on an authentication of a profile of the requester; and
in response to the verification that the requester has the access, providing one or more of the one or more first tagged code features to the requester based on the requested features having been tagged as tagged code features.

2. The computer implemented method of claim 1, wherein the set of code received from the first organization is tagged with one or more hashtags.

3. The computer implemented method of claim 1, wherein the repository storing the one or more tagged code features stores the tagged code features using a source control manager.

4. The computer implemented method of claim 3, wherein the source control manager temporarily stores the tagged code features in a branch repository.

5. The computer implemented method of claim 3, wherein access permissions are required to access the repository storing the one or more tagged code features.

6. The computer implemented method of claim 1, wherein the one or more code features are database objects that permit storing of data that is specific to one or more of the first organization and the second organization.

7. The computer implemented method of claim 6, wherein the one or more database objects are customizable by one or more of the first organization and the second organization.

8. The computer implemented method of claim 7, wherein the one or more database objects of the first organization are related to one or more other database objects of the second organization.

9. A system comprising:
one or more computing devices;
a memory storing one or more computer readable instructions stored in the memory and accessible by the one or more computing devices, that when executed by the one or more computing devices cause the system to:
receive a set of code from a first organization, wherein the set of code comprises one or more code features;
tag the one or more code features with one or more code feature tags to associate each of the one or more code features with the one or more code feature tags;
store the one or more tagged code features in a repository based on the one or more code feature tags, wherein the repository is at least partially accessible by a second organization, wherein the second organization corresponds to an organization that is to be merged with the first organization, and wherein the one or more tagged code features comprise the one or more code feature tags tagged based at least on commonality of practices between the first organization and the second organization;
receive a request for one or more features from a requester, wherein the requester is a member of the second organization;
identify one or more first tagged code features from the one or more tagged code features based on the request received;
generate at least one data repository using the one or more first tagged code features;
determine if the one or more requested features are tagged code features in the at least one data repository;
verifying if the requester has an access to the requested one or more features in the at least one data repository based on an authentication of a profile of the requester; and
in response to the verification that the requester has the access, provide one or more of the one or more first tagged code features to the requester based on the requested features having been tagged as tagged code features.

10. The system of claim 9, wherein the set of code received from the first organization is tagged with one or more hashtags.

11. The system of claim 9, wherein the repository storing the one or more tagged code features stores the tagged code features using a source control manager.

12. The system of claim 11, wherein the source control manager temporarily stores the tagged code features in a branch repository.

13. The system of claim 11, wherein access permissions are required to access the repository storing the one or more tagged code features.

14. The system of claim 9, wherein the one or more code features are database objects that permit storing of data that is specific to one or more of the first organization and the second organization.

15. A computer implemented method comprising:
receiving a request to generate a temporary organization in which to test one or more features of a test product;
generating the temporary organization in response to the received request to generate the temporary organization;

verifying if a first user has an access to the temporary organization based on an authentication of a profile of the first user;

in response to the verification that the first user has the access, providing access to the first user to access the temporary organization;

receiving one or more developed features that have been tagged with one or more feature metadata tags, wherein the feature metadata tags are related to the feature of a business domain, and wherein the one or more developed features comprise the one or more feature metadata tags tagged based at least on commonality of practices of the business domain of the temporary organization;

storing the one or more received features that have been tagged with the one or more feature metadata tags in an expected metadata database;

receiving a request from a second user for one or more of the received features based on the metadata tags associated with the received feature;

identifying one or more first received features from the one or more received features based on the request received;

generating at least one data repository using the one or more first received features;

verifying if the second user has an access to the requested one or more of the first received features in the at least one data repository based on an authentication of a profile of the second user; and in response to the verification that the second user has the access, providing the one or more first requested features to the second user based on the received request.

16. The computer implemented method of claim 15, wherein a repository storing the one or more tagged code features stores the tagged code features using a source control manager.

17. The computer implemented method of claim 15, wherein a source control manager temporarily stores the tagged code features in a branch repository.

* * * * *